March 28, 1950     S. W. ALDERFER     2,502,301
ORAL INFLATION VALVE
Filed Sept. 20, 1945
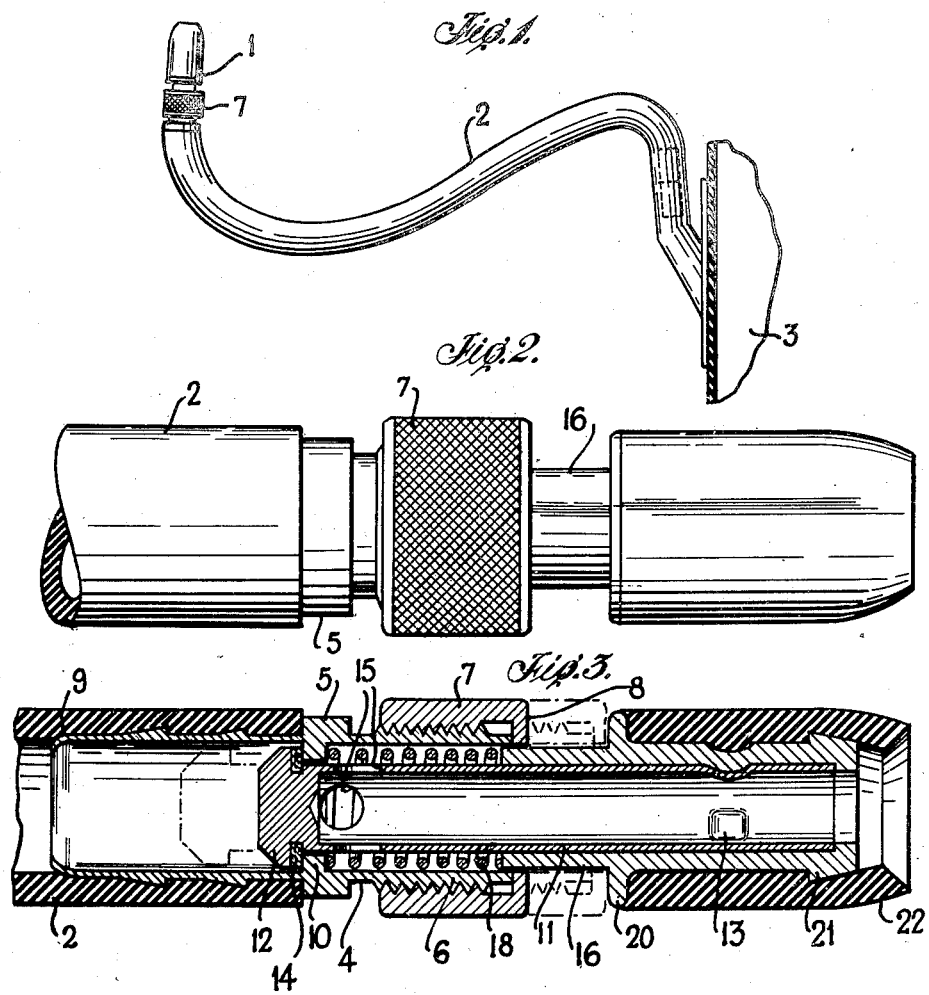
Inventor
STERLING W. ALDERFER

UNITED STATES PATENT OFFICE 2,502,301

ORAL INFLATION VALVE

Sterling W. Alderfer, Akron, Ohio, assignor to Andrews-Alderfer Processing Company Incorporated, Akron, Ohio, a corporation of Ohio Application September 20, 1945, Serial No. 617,502

2 Claims. (Cl. 251—8)

The present invention relates to the manufacture of low pressure valves such as may be used for the oral inflation of life belts, life vests, floats and the like where the devices are inflated by the wearer. One of the principal objects of the invention is to provide a very simple and easily operated valve which is constructed and designed so that the user will instinctively open the valve when it is pressed against the mouth for inflation, and which will instantly close when the valve is removed from the mouth. The valve is further designed so that it will retain the air effectively even at the low pressures which are obtained by mere oral inflation. A further object of the invention is to design a valve which will permit the free and unobstructed flow of air through the valve when it is open so as to obtain the rapid inflation of the article to which it is attached.

The principal advantages of the construction shown and described are simplicity, and ease of operation, and effectiveness of the valve to retain air at low pressure. It will be understood that the invention is disclosed in its best known and preferred form, but that changes or modifications may be made therein without departing from the principles of the invention as set forth in the appended claims.

In the drawings:

Fig. 1 is a side elevation of the inflation device as it may be attached to any type of inflatable device, such as a life belt, life vest or float;

Fig. 2 is an enlarged view of the valve; and

Fig. 3 is a section through the valve.

The new and improved valve is indicated in general by the numeral 1 in Fig. 1. It is usually attached to a piece of flexible hose or tubing 2, which communicates with the interior of an inflatable object or bladder indicated at 3. This may be any form of inflatable device, and is ordinarily one which may be worn on the person.

The present form of oral inflation valve is superior to prior valves of this general type in that the act of pressing the valve against the mouth will open the valve for the admission of air from the lungs and immediately the pressure is released, the valve will close, effectively shutting off escape of air from the interior of the article. The result is that the person who is suddenly plunged into the water does not have to fumble with the valve to open or close it. This is extremely valuable in emergencies. The device is so constructed that when removed from the mouth, it will automatically retain the air within the article, but it is also capable of adjustment so that the seal is rendered more effective and the valve can not be opened accidentally.

The flexible hose 2 is permanently secured to one end of a hollow valve stem which is preferably a short piece of tubing 4 usually of metal. The end of the tubing is rounded as shown at 9 so as to avoid strain on the hose at this point. Midway of the tubing is a shoulder 5 against which the end of the hose 2 may abut. Outwardly of the shoulder the exterior of the stem is provided with a screw-threaded portion 6. Engaging the part 6 is a screw-threaded thimble or hand-grip 7, the outer end of which is formed with an inturned shoulder 8 which limits the inward movement of the grip on the tubing 4. The outer surface of the grip or hand piece 7 is usually roughened.

At some point the interior of the tubing 4 is provided with a circular valve seat 10, through which slides an inflator tube or valve 11 provided with a head 12 adapted to rest against the inner face of the valve seat where it may carry an air tight sealing gasket 14. At a short distance outwardly of the head the tube 11 is apertured as at 15 so that when the valve is depressed for inflation, these openings permit air to flow freely from the interior of the tube 11 to the object to be inflated. The position of the head during inflation is shown by dotted lines in Fig. 3.

Surrounding and fixed to the outer portion of the tube 11 is a sheath 16 the inner end of which is spaced from the valve seat 10 to accommodate a coil spring 18 which serves to hold the valve head 12 against the seat 10. The sheath is attached to the tube by deforming the stock after assembly as shown. This may be done by crimping the sheath into tube 11 at three or more points as illustrated at 13 in Fig. 3. The tension on the spring 18 should be relatively light so that the valve may be opened easily, but should be sufficient to insure a reasonably tight seal at the valve.

Midway of the sheath 16 is a shoulder 20 and at the end of the sheath is a second shoulder 21. A mouthpiece 22, usually formed of rubber, is fitted over the end of the sheath.

When the article is to be inflated, the valve is held by the hand piece or collar 7 and the mouthpiece pressed against the lips. The pressure exerted is sufficient to depress the valve to the dotted line position whereupon the user may inflate the bladder or other article. In this movement the tube 11 is guided by the valve seat 10 and the sliding movement of the sheath 16 in the outer end of the valve stem 4. Upon removal of the mouthpiece from the lips the valve will automatically close and the air will be retained sufficiently so as to keep the article afloat in the water. If for any reason, the valve should jam when in open position beyond the restoring power of the spring, it can be closed by pulling outwardly on the mouthpiece. In order to insure that the valve is not opened accidentally and to force the valve with greater pressure against its seat, the user turns the handgrip or thimble up to the dotted line position shown in Fig. 3, and the article is more effectively and permanently sealed.

It will be seen that a very simple and effective oral valve has been designed which is easy to operate and can not get out of order. The temporary seal afforded by the expansion of the spring 18 is sufficient to hold the air in all usual cases, but the seal may be made more secure and positive by turning the thimble up on the sheath beneath the shoulder 20.

The tube 11, the area of the holes 15 and the space around the head 12 are so proportioned that a free flow of air is permitted through the valve. For example, a unit which will fit into a 1/4" I. D. rubber tubing, without excessive stretching, will deliver 50 liters of air per minute at 70° F. with a hydrostatic pressure of 9½" of water. These details which permit a free and easy flow of air through the valve are of extreme importance in the manufacture of an oral inflation device for attachment to life saving equipment.

What is claimed is:

1. An inflation device adapted for oral inflation comprising a hollow stem for attachment to an inflatable article, a sliding tubular valve telescopically mounted in the stem and having a head closing the inner end of the valve and engaging a valve seat in the stem, the valve being apertured adjacent the head, a mouthpiece on the outer end of the valve, a hand grip on the stem, a spring surrounding the valve and tending to hold the head against the valve seat and the mouthpiece spaced from the hand grip, and a shoulder on the valve, said hand-grip being adjustable along the stem toward the shoulder to prevent movement of the mouthpiece and opening of the valve.

2. An inflation device adapted for oral inflation comprising a hollow stem for attachment to an inflatable article, a sliding tubular valve telescopically mounted in the stem and having a head closing the inner end of the valve and engaging a valve seat in the stem, the valve being apertured adjacent the head, a sheath surrounding the tubular valve held thereon by distortion of the metal of the valve and sheath, a mouthpiece on the outer end of the valve, a hand-grip on the stem, and a spring surrounding the valve and tending to hold the head against the valve seat and the mouthpiece spaced from the hand-grip, said hand-grip having screw-threaded engagement with the stem and adjustable thereon to abut the mouthpiece and thus prevent movement of the valve.

STERLING W. ALDERFER.

REFERENCES CITED

The following references are of record in the file of this patent:

UNITED STATES PATENTS

| Number | Name | Date |
| --- | --- | --- |
| 1,231,602 | Hart | July 3, 1917 |
| 1,538,484 | Hahn | May 19, 1925 |
| 2,088,656 | Lamb | Aug. 3, 1937 |
| 2,245,097 | Tobler | June 10, 1941 |

FOREIGN PATENTS

| Number | Country | Date |
| --- | --- | --- |
| 1,762 | Great Britain | July 13, 1861 |